US009674644B2

United States Patent
Polo et al.

(10) Patent No.: US 9,674,644 B2
(45) Date of Patent: Jun. 6, 2017

(54) METHOD FOR DETERMINING DIRECTIONALITY USING BLUETOOTH LOW ENERGY COMMUNICATIONS

(71) Applicant: BROADCOM CORPORATION, Irvine, CA (US)

(72) Inventors: Angel Arturo Polo, Solana Beach, CA (US); Thomas Francis Baker, Monarch Beach, CA (US); Michael David Herndon, Laguna Niguel, CA (US); Arthur H Jin, San Diego, CA (US); Fredrick Lee Chen, San Diego, CA (US)

(73) Assignee: Avago Technologies General IP (Singapore) Pte. Ltd, Singapore (SG)

( * ) Notice: Subject to any disclaimer, the term of this patent is extended or adjusted under 35 U.S.C. 154(b) by 0 days.

(21) Appl. No.: 14/882,180

(22) Filed: Oct. 13, 2015

(65) Prior Publication Data

US 2016/0105761 A1    Apr. 14, 2016

Related U.S. Application Data

(60) Provisional application No. 62/063,827, filed on Oct. 14, 2014.

(51) Int. Cl.
*H04W 4/00* (2009.01)
*H04W 56/00* (2009.01)
*H04W 64/00* (2009.01)
*H04W 84/18* (2009.01)

(52) U.S. Cl.
CPC ......... *H04W 4/008* (2013.01); *H04W 56/001* (2013.01); *H04W 64/006* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2013/0188538 A1* | 7/2013 | Kainulainen | G01S 3/48 370/310 |
| 2015/0230285 A1* | 8/2015 | Park | H04W 76/028 455/41.2 |
| 2016/0165397 A1* | 6/2016 | Yang | H04W 64/00 455/456.5 |

* cited by examiner

*Primary Examiner* — Alejandro Rivero
(74) *Attorney, Agent, or Firm* — Garlick & Markison; Randy W. Lacasse

(57) ABSTRACT

A method and system detect directionality between two objects by measuring angles of signals incident on antenna arrays on at least one side to determine angle of incidence. The methods utilize Bluetooth Low Energy communications for both the control protocol and for providing updated information for deriving directionality. Directionality information is broadcast on selected BLE advertising or data channels, or broadcast using a hopping pattern over the BLE data channels, both at a specific interval duty cycle. If a hopping pattern is selected to transmit directionality information, then anchor information is simultaneously broadcast on the BLE advertising or data channels at a different, asynchronous duty cycle. In additional embodiments, signals incident on antenna arrays located on both target and tracking sides are used to determine angle of incidence, separate antennas are combined to form new antennas and antenna models are used to anticipate known antenna structure responses.

20 Claims, 10 Drawing Sheets

METHOD FOR DETERMINING DIRECTIONALITY USING BLUETOOTH LOW ENERGY COMMUNICATIONS

CROSS REFERENCE TO RELATED PATENTS

The present U.S. Utility Patent Application claims priority pursuant to 35 U.S.C. §119(e) to U.S. Provisional Application No. 62/063,827, entitled "Method for Determining Angle of Arrival Using Bluetooth Low Energy", filed Oct. 14, 2014, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

Technical Field

The present disclosure relates to a method and system for communications. More specifically, it is related to Bluetooth® applications.

Description of Related Art

Bluetooth® (hereinafter "BT") wireless technology is a short-range communications system utilized to wirelessly link portable and/or fixed electronic devices, such that cables and wires that would normally connect these devices are not needed. Presently, there are two forms of BT wireless technology systems. One form of BT is the Basic Rate (BR) system, which is also referred to as classic Bluetooth, since this system has been in existence for some time and currently implemented in wirelessly connecting devices. The second form is a newer implementation of BT, known as Low Energy (LE) BT or Bluetooth Low Energy (BLE).

Disadvantages of conventional approaches will be evident to one skilled in the art when presented in the disclosure that follows.

BRIEF DESCRIPTION OF THE SEVERAL VIEWS OF THE DRAWING(S)

DETAILED DESCRIPTION

Technology described herein utilizes Bluetooth Low Energy communications to provide updated information for deriving directionality. Directionality provides a means for one device to determine its relative angle to another object (e.g., beacon or other device). The methods disclosed include broadcasting the directionality field in a power efficient manner across the BLE data channels.

Figure 1:
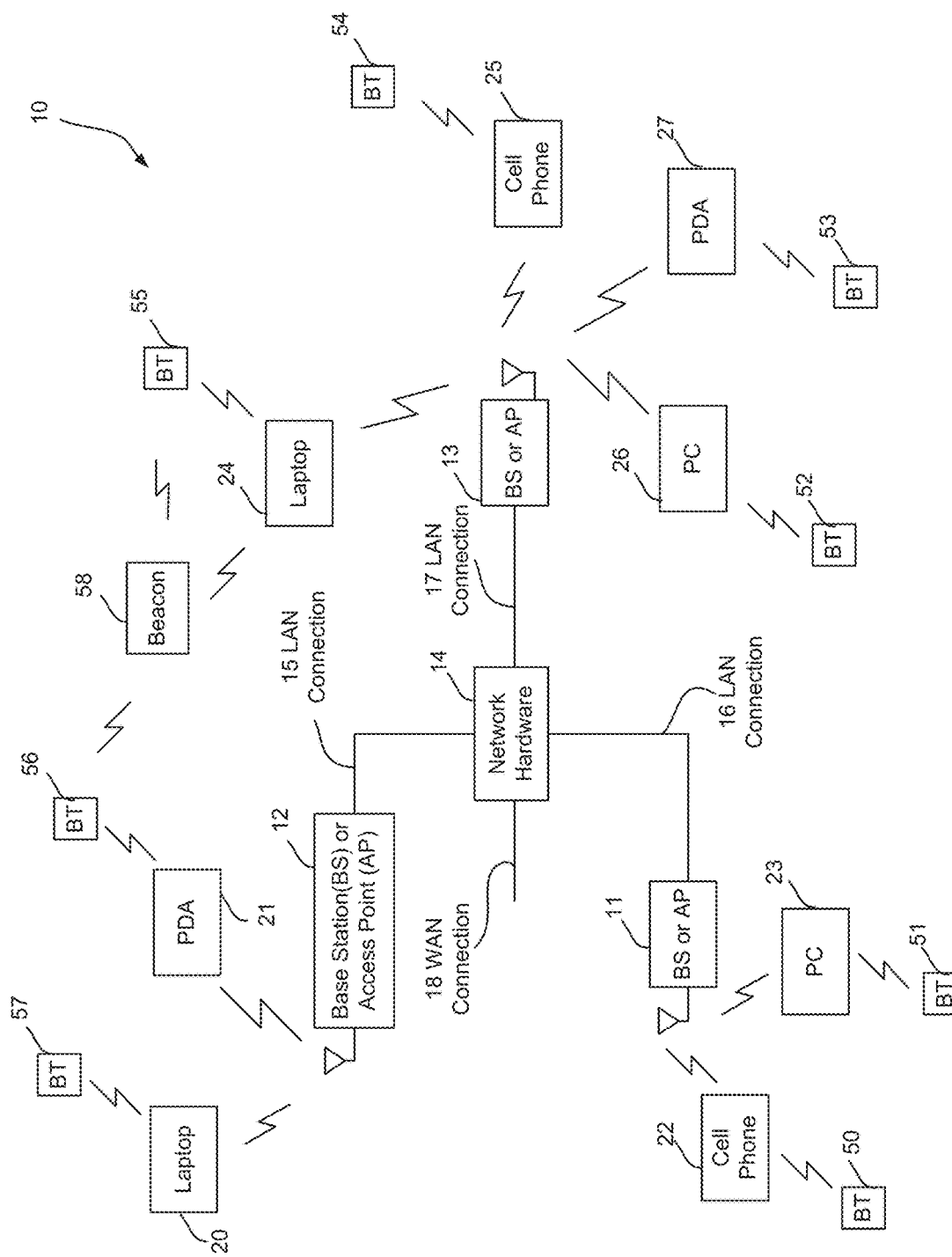
FIG. 1 is a block diagram showing a wireless communication system in accordance with the present disclosure.

FIG. 1 is a block diagram showing a wireless communication system in accordance with the present disclosure. As shown, a communication system 10 includes a plurality of base stations (BS) and/or access points (AP) 11-13 (an AP may be a personal control point or PCP), a plurality of wireless communication devices 20-27 and a network hardware component 14. The wireless communication devices 20-27 may be laptop computers 20 and 24, personal digital assistants 21 and 27, personal computers 23 and 26, cellular telephones 22 and 25, and/or any other type of device that supports wireless communications.

The base stations or access points 11-13 may be operably coupled to network hardware 14 via respective local area network (LAN) connections 15-17. Network hardware 14, which may be a router, switch, bridge, modem, system controller, etc., may provide a wide area network (WAN) connection 18 for communication system 10. Individual base station or access points 11-13 have an associated antenna or antenna array to communicate with other wireless communication devices in its area. Typically, the wireless communication devices register with a particular base station or access point 11-13 to receive services within communication system 10. For direct connections (i.e., point-to-point communications), wireless communication devices may communicate directly via an allocated channel.

Typically, base stations are used for cellular telephone systems including, for example, 3G and 4G systems and like-type systems, while access points are used for in-home or in-building wireless networks. Regardless of the particular type of communication system, each wireless communication device includes a built-in radio and/or is coupled to a radio. The radio includes a linear amplifier and/or programmable multi-stage amplifier to enhance performance, reduce costs, reduce size, and/or enhance broadband applications. The radio also includes, or is coupled to, an antenna or antennas having a particular antenna coverage pattern for propagating of outbound RF signals and/or reception of inbound RF signals. In some instances, the antennas may be directional antennas.

One or more of the shown devices may include circuitry and/or software which allow the particular device to communicate using BT communication system technology with each other or with proximal BT devices 50-57. Generally with BT, the range is much shorter than typical WLAN links. The BT communication link may utilize various versions of the BT specification, including the afore-mentioned Bluetooth 4.0 and above specification. The particular portion of the specification that pertains to the present disclosure is the Bluetooth low energy (BLE) portion of the specification. Although BLE may operate in conjunction with classical BT, BLE does have a functional difference in the application of the protocol for establishing a communication link between two or more BLE compatible devices.

Beacons, such as beacon 58, are hardware transmitters in a class of Bluetooth low energy (LE) devices that broadcast their identifier to nearby (proximate—e.g., 100 ft) BT enabled portable electronic devices (e.g., 24, 55 and 56). The technology enables wearable computers, smartphones, tablets, laptops and other devices to perform actions when in close proximity to the beacon. Typically, beacons use Bluetooth low energy proximity sensing to transmit a universally unique identifier picked up by a compatible app or operating system. The identifier can be used to determine the device's physical location, track customers, or trigger a location-based action on the device such as a check-in on social media or a push notification.

Another application is an indoor positioning system, which helps mobile devices such as smart phones determine their approximate location or context. For example, with the help of a beacon, a smartphone's software can approximately find its relative location to a beacon in a store. Brick and mortar retail stores use the beacons for mobile commerce, offering customers special deals through mobile marketing, and can enable mobile payments through point of sale systems.

Figure 2:
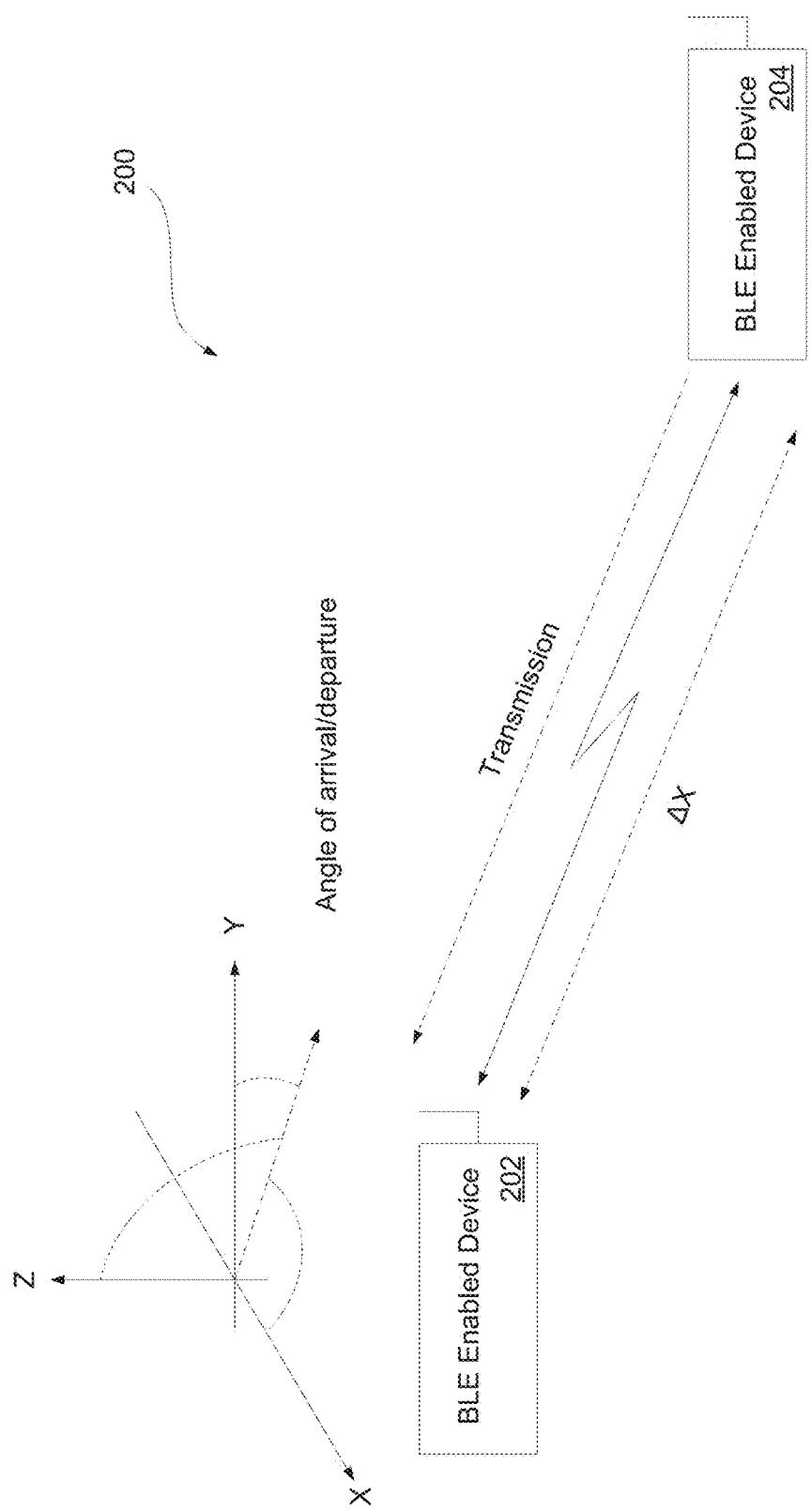
FIG. 2 is a block diagram showing an embodiment of a directional relationship between two Bluetooth wireless communication devices in accordance with the present disclosure.

FIG. 2 is a block diagram showing an embodiment of a directional relationship between two Bluetooth wireless communication devices in accordance with the present disclosure. As shown, embodiment 200 illustrates a physical relationship between at least a first wireless communication device 202 (BLE enabled) and a second communication device (wireless or wired) 204 (also BLE enabled) in terms of angle of arrival/departure estimation there between. The two communication devices 202 and 204, separated by some distance X. As a communication is transmitted from second communication device 204 to first wireless communication device 202, the communication or received signal will arrive at first wireless communication device 202 at a particular angle (as defined with respect to some reference of the first wireless communication device 202). Angle of incidence circuitry (e.g., a processor in association with computer code) resident on the first wireless communication device 202 will determine one or more angles of incidence using known geometric calculations or using predetermined antenna models based on a present antenna configuration (e.g., multiple antenna array). Any of a number of desired coordinate systems may be employed to reference the angle of arrival. Some examples include vector or Cartesian coordinates (x, y, z), spherical coordinates ($\rho$, $\theta$, $\phi$), or cylindrical coordinates (r, $\phi$, z), etc.

The second device, in one embodiment is a fixed location device with known location such as a Beacon. Beacon directionality provides a means for one device to determine of its angular relationship with a transmitting beacon. A beacon is a transmitter which transmits a continuous or periodic radio signal with limited information content (for example its identification or location), on a specified radio frequency.

Figure 3:
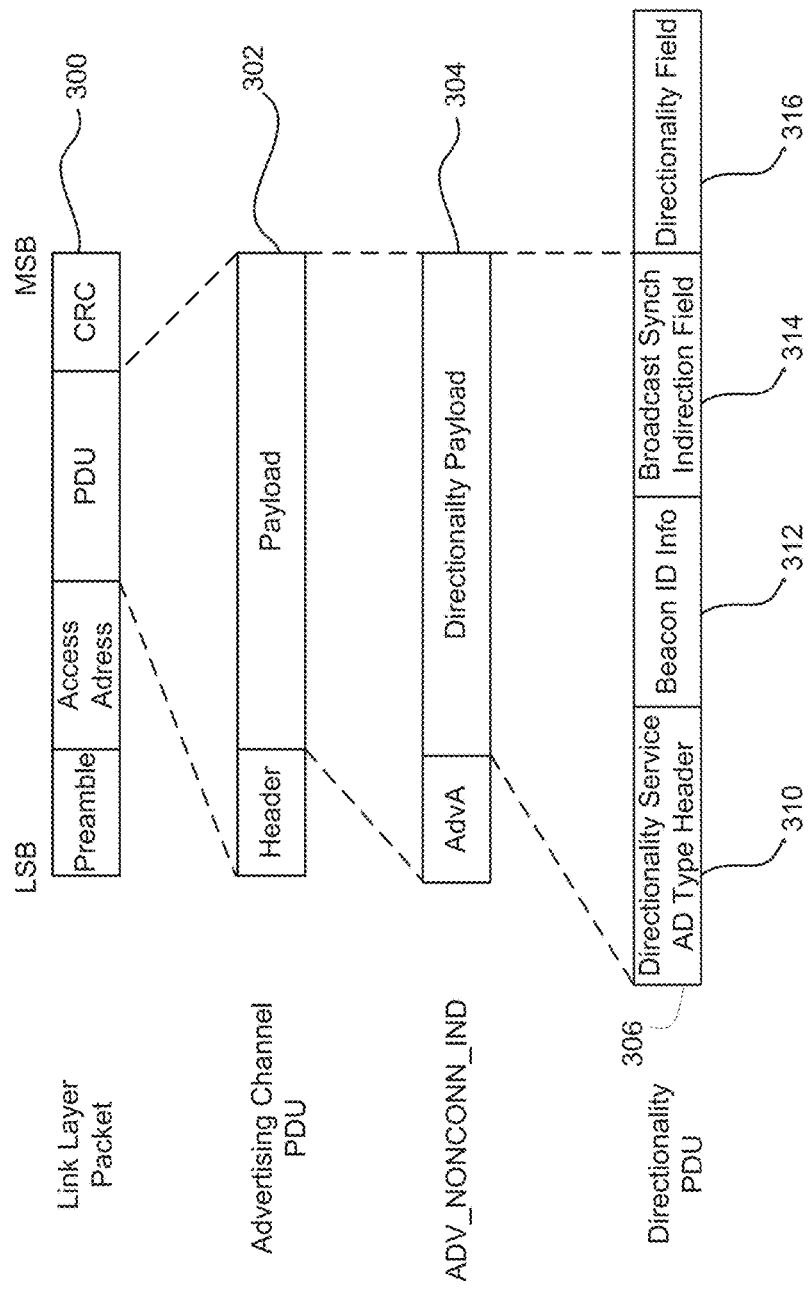
FIG. 3 is a block diagram of an embodiment of adding directionality to BLE transmissions in accordance with the present disclosure.

FIG. 3 is a block diagram of an embodiment of adding directionality to BLE packet transmissions in accordance with the present disclosure. Simplified directionality is used to denote methods where precise device placement, map coordinates, coordinated location databases and such are not required to determine directionality. In one or more embodiments described herein, directionality fields are appended to the end of a standard BLE packet (after the CRC field).

BLE communication signals operate within a 40-channel (0-39) partition of 2 MHz bands. Of these 40 channels, 37 are dedicated to data and 3 dedicated to advertising. Advertising channels allow the discovery of devices available in the vicinity. Upon a connection request, the same channels are used for initial connection parameter exchanges. Once a device is discovered and connection is initiated, regular data channels are used for communication.

A first example format uses 3 selected BLE channels used for carrying broadcast ad-hoc directionality events. In the most conformant variation, the 3 channels may be the regular LE Advertisement channels, though any of the 40 BLE channels may be used. In this mode, when scanning for broadcasts (on the 3 channels) the receiver must be prepared to accept the directionality field on all receive events. Once the receive event closes, post processing is employed in order to determine if a proper directionality field was actually received (from an intended target vs. another ad-hoc transmitter).

In a second format 3 selected BLE channels are used for carrying broadcast ad-hoc discovery events. These discovery events contain information to direct the tracker to BLE data channel broadcasts carrying the directionality information. BLE Data Channels are used with a transmitter/receiver synchronized, hopping pattern to carry broadcast directionality events.

Two mechanisms are employed for broadcast advertisement packet discrimination (i.e. to determine which packets are from intended directionality targets). The first method employs a white list mechanism if directionality target addresses are known a-priori. This may include the use of Resolvable Private Address filtering in addition to or in lieu of Public address filtering.

The second method uses a user specified AD Type to filtering. In this case, only the AD Type header is matched and not the value portion of the user specified content. In addition, in one embodiment, the payloads of Advertising Packets that carry Directionality Fields may be encrypted.

As shown in FIG. 3, a BLE communication link layer packet 300 includes a preamble used for internal protocol management. The preamble is followed by an access address and Protocol Data Unit (PDU) 302 which can be in either a data or an advertising format as designated by the channel it is transmitted on (i.e., advertising or data). PDU 302 is followed by a Cyclic Redundancy Check (CRC) to provide bitwise error checking Advertising channels are typically 37, 38, and 39 and are allocated in different parts of the spectrum (e.g., spread out within 40 channels) to provide immunity against interference from 802.11/Wi-Fi. However, the present disclosure packet format is not restricted to this format and can use future communications standards with new channel and packet formats without departing from the scope of the technology disclosed herein.

There are typically multiple types of advertising payloads—both connected and non-connected, directed and undirected, although not limited thereto. In an example embodiment illustrated in FIG. 3, an ADV_NONCONN_IND (Non-connectable undirected advertising) payload type 304 is chosen for advertising. This advertising payload is chosen for devices that want to broadcast, but don't want to be connected or scanned. This option is typically chosen for a device that is only a transmitter (e.g., beacon). Connectionless directionality allows for virtually unlimited capacity for tracking a device as broadcast transmissions are employed by the target device to transmit the directionality field. In the various embodiments disclosed herein, directionality information may be broadcast on multiple (e.g., three) selected BLE advertising or multiple (e.g., three) selected BLE data channels, or it may be broadcast using a hopping pattern over the BLE data channels, both at a specific interval duty cycle. If a hopping pattern is selected to transmit directionality information, then anchor information (described further hereafter) will be simultaneously broadcast on the three BLE advertising or data channels at a different, asynchronous duty cycle.

The ADV_NONCONN_IND payload type 304 includes an AdvA (Advertisers public or random device address) as well as a directionality payload 306 to assist in determining directionality. Directionality payload packet 306 may include a Flags AD Type field indicating the type of discovery (e.g., limited or general discoverable mode) followed by a directionality service AD type field 310. In one embodiment, the directionality service AD type is a user specified directionality service AD type to be specified if the receiving tracker device is intending to use that field as a filter. The payload content 312 of this AD Type may be arbitrary data such as beacon ID info including, but not limited to, coordinates (e.g. latitude, longitude, and altitude), sensor ancillary data (e.g. compass orientation), beacon identification (e.g. UUID values), beacon diagnostic information, array identification or configuration information, or any other information that is useful in assisting indoor geo location. Immediately following directionality payload packet 306 is a directionality (e.g., all ones (1111111)) field 316. The ones are phase shifted, for example, 250 KHz forward in repetition. At the receiver, removal of the carrier signal yields the 250 KHz signal. The size of the complete Directionality packet (standard LE packet+Directionality field) may exceed the maximum size of a standard LE packet max PDU (protocol data unit) length.

In one embodiment, the directionality service AD type includes Broadcast Synchronization Indirection Fields 314. These fields are required if the receiver is to be directed to a synchronized broadcast stream to retrieve the Directionality information. In other words, if this is a connectionless system, the receiver must be given additional information (anchor information) to sync to the frequency hopping pattern. Therefore, the format of the directionality service AD type specifies synchronization information necessary to acquire the target's broadcast synchronization stream. The field includes a length field service UUID (e.g., for antenna structure identification) and Broadcast Synchronization Indirection Fields (anchor information) 314. These fields may include an AA (access address) by which to correlate on when receiving a packet broadcast synchronization stream; Offset—time value offset to the next packet in the broadcast synchronization stream. It is measured from the end of the last bit of the current packet to the beginning of the first bit of the next packet of the broadcast synchronization stream. Valid ranges for this field are 2-1023 which denote units of, for example, 2.5 ms; Interval—set to broadcast interval of the synchronized broadcast stream; ChM (channel map)—contains the channel map indicating which data channels are in use. Each bit position in this fields denotes a channel index from 0-39 mapping directly to BLE channel indices. A value of 1 in each bit position indicates that the channel is in use; Hop—indicates a hop increment used in an example BLE mod 37 channel hop algorithm—a valid range for this field is 5-16; and SCA (sleep clock accuracy)—denotes the tracking device's clock accuracy estimate. And finally, Next Chan (next channel)—is a directionality PDU field that identifies the next channel index for the tracking receiver to listen for the broadcast synchronization stream. Valid range for this field is 0-39 which map directly to the BLE channel index.

In one embodiment, directionality between two objects is measured using antenna arrays on both sides (departure and receiving) to determine angle of incidence. The length of the directionality field typically is a constant size equal to the amount of time necessary to send or receive samples from the entire antenna array at least once with repetition for some of the array elements. An antenna array element transmit/receive and transition time for both transmit and receive sides, in various example embodiments, can be 2 or 4 µs, but not limited thereto.

In another embodiment, the technology described herein can be equally practiced in a connection (e.g., peer-to-peer) model. This model is particularly effective with two mobile BLE enabled wireless devices (peers), although not limited thereto. The two models can practice the components of the technology disclosed herein. This model may include any of the following requirements: Directionality determined using secure BLE data channels. The term secure denotes the following subsequent requirements: both sides are paired and bonded with each other with secure keys; all user payloads carried are encrypted and signed; and, optionally, both sides use Resolvable Private Addresses on BLE Advertising Channels; GATT (Generic Attribute Profile) based services are used to signal indication of feature support; GATT based services are used to start the function; Directionality information is transmitted using the same physical BLE channel as is used for other user profiles and information exchanges; and the use of this feature does break backward compatibility with other vendor Bluetooth implementations.

Figure 4:
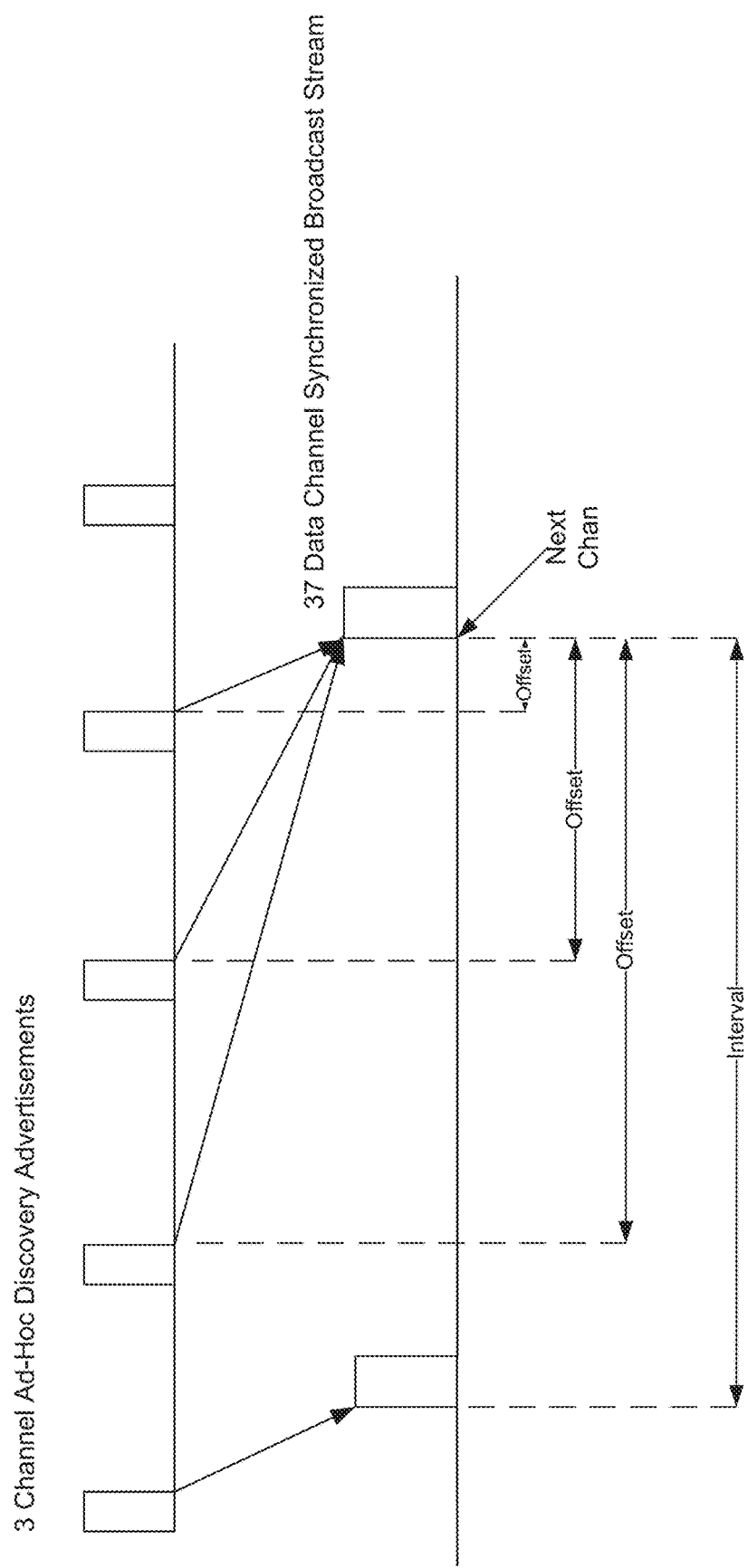
FIG. 4 is a diagram illustrating an embodiment for synchronizing using BLE advertising channels in accordance with the present disclosure.

FIG. 4 is a diagram illustrating an embodiment for synchronizing using BLE advertising channels in accordance with the present disclosure. A tracking receiver can latch on to a synchronized broadcast stream carrying the all ones field transmitted from a target using connectionless AoA or AoD (angle of arrival/angle of departure). In the figure, the target is transmitting BLE Advertisements on the 3 advertisement channels in order to be discovered (by a tracker). The target is also simultaneously transmitting with adjunct timing a synchronized broadcast stream carrying BLE packets that are also appended by the all ones field. In a connectionless hopping embodiment, the packets sent in the advertisement channels contain the information necessary (in the packet payload) to latch on to the synchronized broadcast stream. Once a tracker discovers the target from the advertisement channels, it can then jump (using the offsets) to the synchronized broadcast stream and begin continuous tracking in a power efficient manner. As shown, in a first format, multiple 3-channel advertisements are pointing to the same broadcast synchronization stream PDU.

In this example, the offset fields of each 3-channel advertisements must be adjusted to depict the timing relative to actual packet transmission.

Alternatively, a second format of indirection information may be sent depicting the occurrence of only the next packet in the broadcast synchronization stream. Here, only two fields are specified which are the Offset and Next Channel fields. If this indirection format is used, the target transmitter has the option to include the first format in the payload of the broadcast synchronization stream itself. In this case the receiving tracking device would then proceed to follow the broadcast synchronization stream after processing the first packet in that stream as previously described in association with the first format.

Alternatively, the target transmitter may continue to include the second format in the payload of the broadcast synchronization stream. In this case, the receiving tracker would continue to follow the stream on a packet by packet basis.

There are at least two reasons to use the second format in lieu of the first format: first format consumes a larger packet payload whereas the second format consumes 2 bytes. If payload real estate is at a premium, second format may be the better option. Including first format in the payload of the actual advertisement broadcast synchronization stream allows for adaptation to changing channel quality metrics. By adjusting the content, the tracking transmitter and receiving tracker can adapt for changing channel conditions actively (based on the transmitter's notion).

Figure 5:
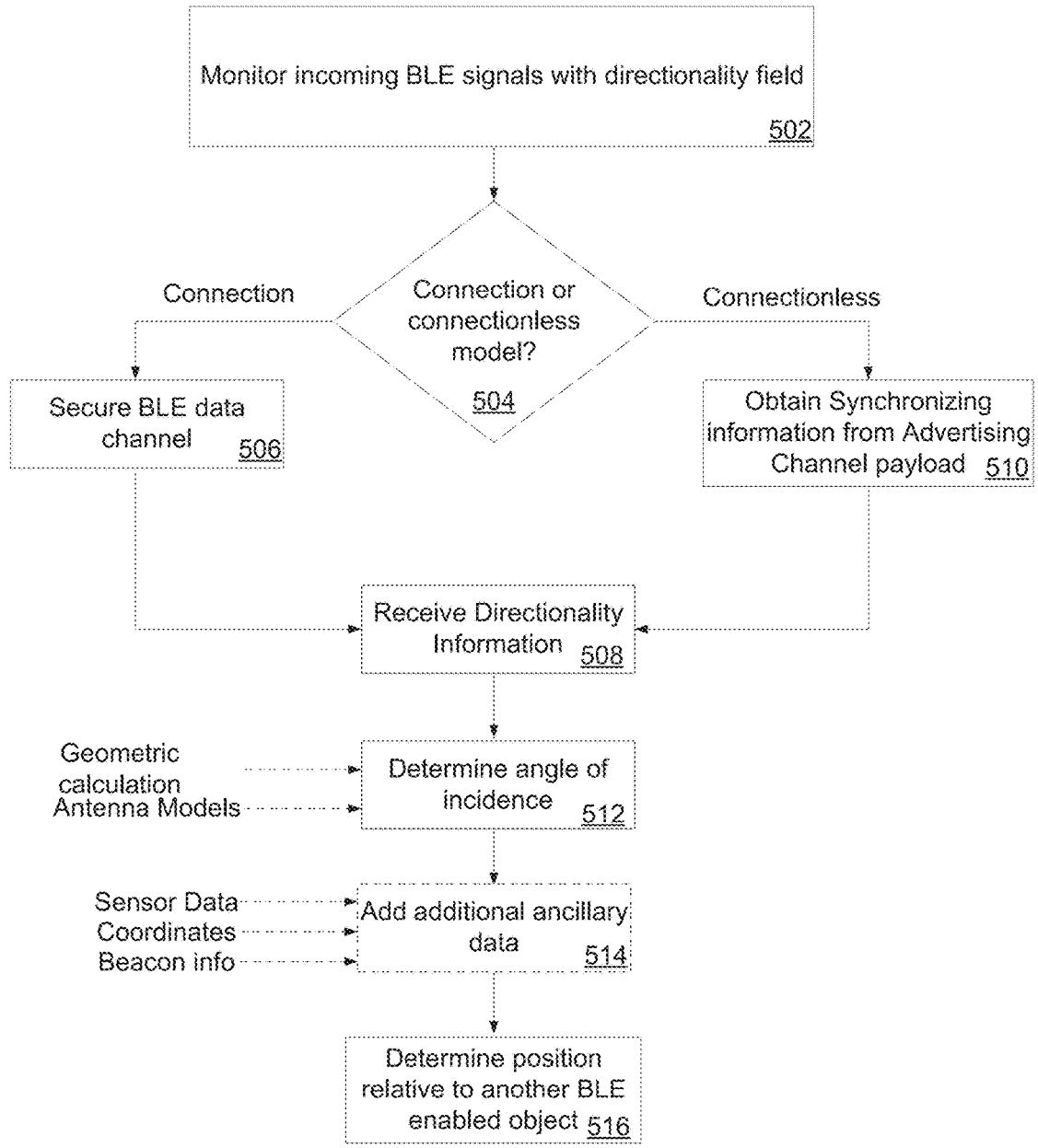
FIG. 5 is a block diagram of an embodiment illustrating determining position relative to another BLE enabled device in accordance with the present disclosure.

FIG. 5 is a block diagram of an embodiment illustrating determining position relative to another BLE enabled device in accordance with the present disclosure. In block 502, a BLE enabled device monitors (scans) for incoming BLE transmissions and more particularly those with potentially a directionality field attached. In block 504, if a BLE connection is to be made (e.g., between two BLE enabled peers), a BLE data channel is secured with encryption and authentication in block 506. If a connectionless model is used (e.g., between a beacon and BLE enabled wireless device), synchronizing information (anchor information) is obtained from a payload of the advertising channel in block 510. Alternately, the broadcast stream may also be secured with encryption and authentication in the connectionless model. Upon synchronizing, both models receive and decode the directionality field attached to the BLE packet in block 508. An angle of incidence is determined in block 512 by using known methods for geometric calculations of incident waves upon an antenna structure or by using antenna models previously derived for a similar antenna configuration. Optionally, in block 514, additional information can be used to assist in making the proper angle determination. Optional information can include, but is not limited to: sensor data from, for example, platform sensors, compass, gyroscope, sensors which detect an angle of a device (e.g., phone), sensors which detect alignment of antenna patterns with angle of phone, etc.; coordinates (e.g. latitude, longitude, and altitude); or beacon information such as, beacon identification (e.g. UUID values), beacon diagnostic information or any other information that is useful in assisting geo location. Based on at least the determined angle of incidence, the position of a BLE enabled device relative to another BLE enabled device is determined. In one embodiment, the determination is made based on a coalescence of multiple angle measurements for one or a plurality of antennas on one or both (AoA and AoD) of the BLE enabled devices.

Figure 6:
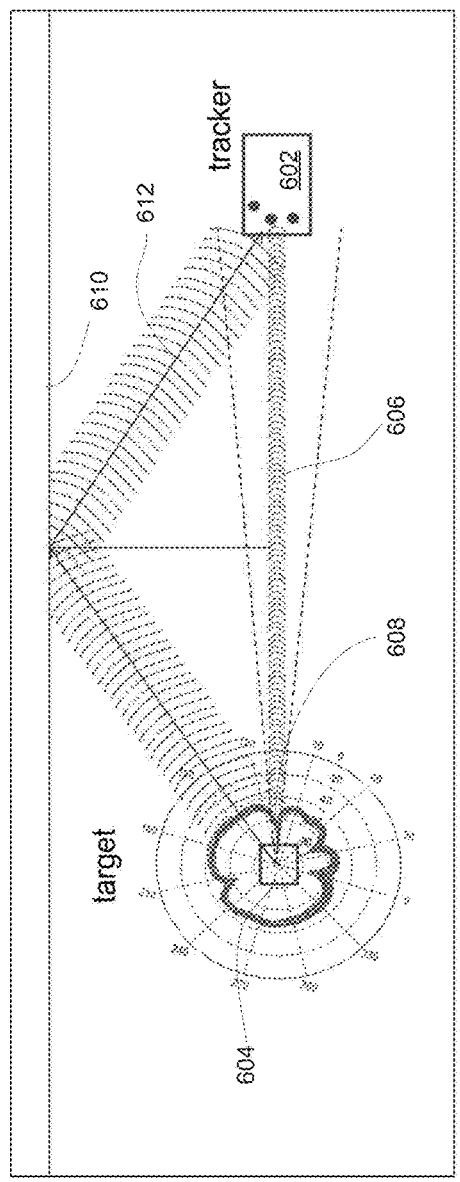
FIG. 6 is a diagram illustrating an example embodiment of detecting reflected beacons from a target in accordance with the present disclosure.

FIG. 6 is a diagram illustrating detecting reflected beacon transmissions from a target in accordance with the present disclosure. One challenge with AoA/AoD in BLE is combating the effects of multipath and antenna nulls and their disruptiveness to deducing relative angle of incidence. In radio electronics, a null is an area or vector in an antenna's radiation pattern where the signal cancels out almost entirely (shown as 608). As shown in FIG. 6, tracker 602 may receive multiple signals from target 604. A first direct path signal 606 (null) and a second path 612 that bounces off, for example a building 610, are both received at tracker 602. Various embodiments will be described hereafter to mitigate the effects of multi-path and antenna nulls.

In a first embodiment, frequency diversity is added to AoD with a method for broadcast synchronization on the 37 BLE data channels. In this embodiment, samples are collected across multiple frequencies with a majority vote. Since the embodiments disclosed herein for BLE AoA/AoD transmit an all ones, un-whitened field at the end of a normal BLE packet, a tracking device only needs to receive the all ones field and determines phase difference relative to the physical geometry of an antenna array which exists at least on one side but may exist on both. In one embodiment, frequency hopping occurs on all 37 channels which are then combined together to determine actual angle of incidence.

Figure 7:
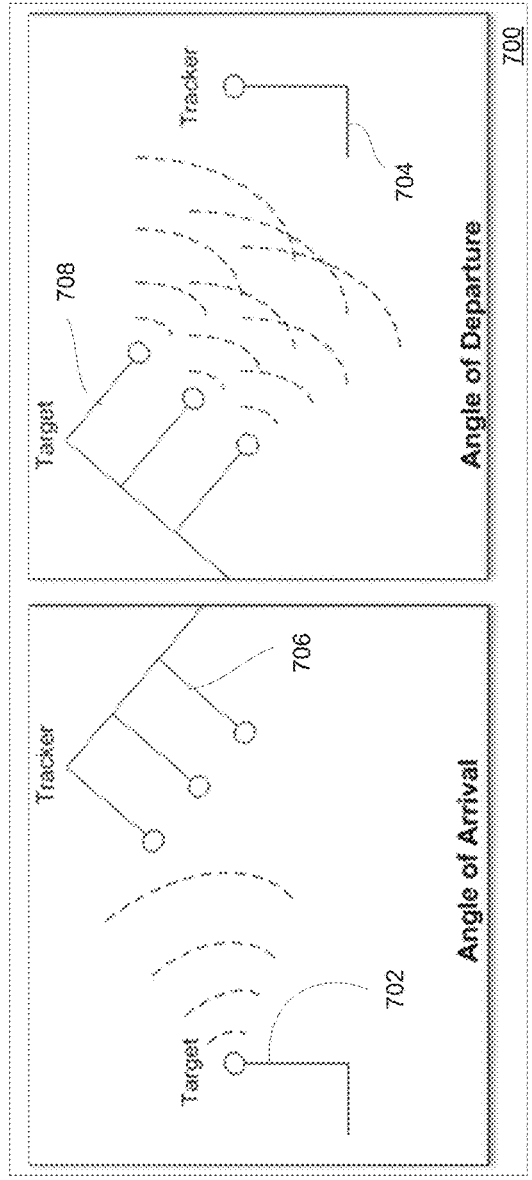
FIG. 7 is a diagram illustrating an example embodiment of detecting angle of arrival and angle of departure for a target in accordance with the present disclosure.
Figure 8:
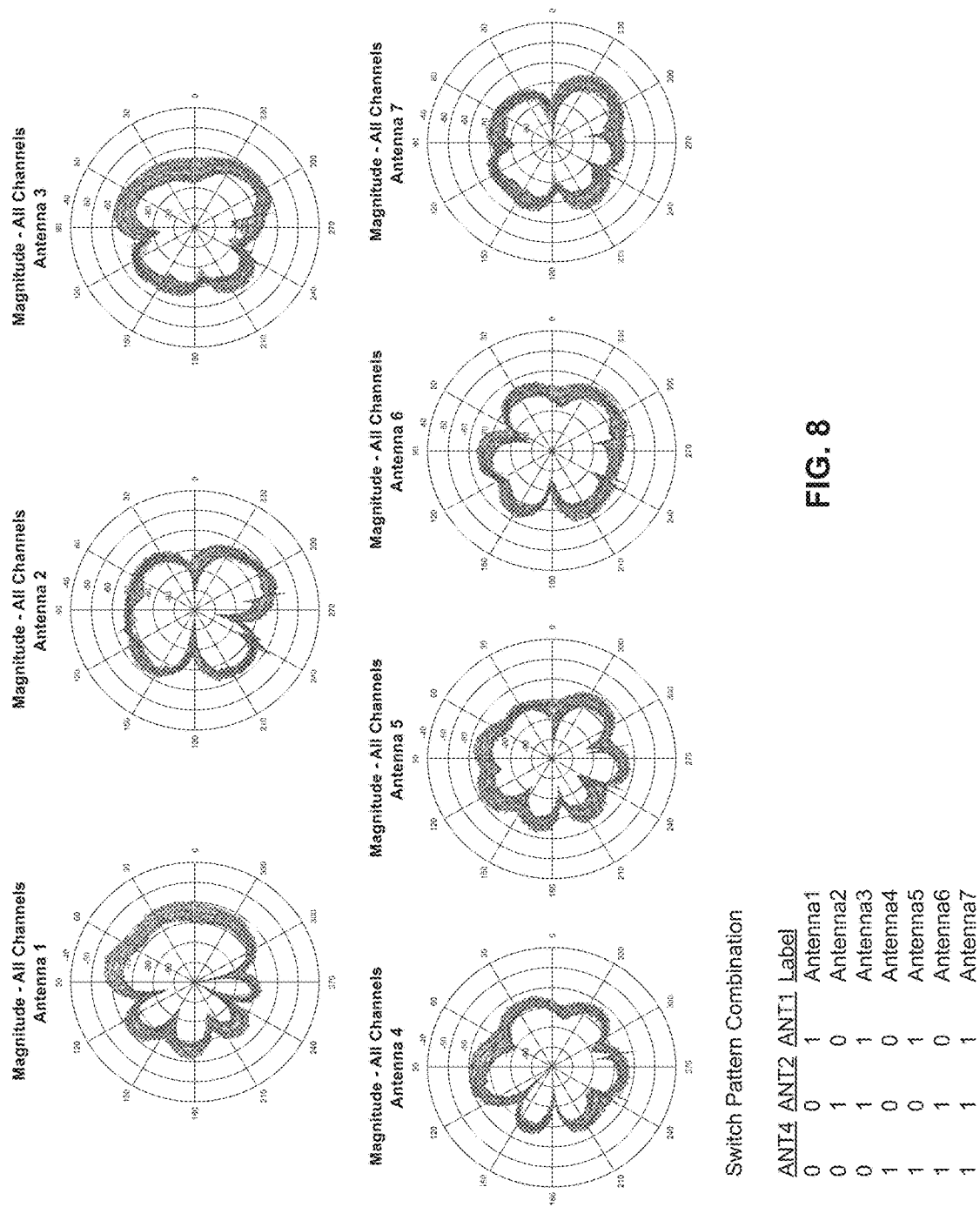
FIG. 8 is a diagram illustrating an example embodiment of antenna array switching patterns in accordance with the present disclosure.

FIG. 7 is a diagram illustrating an example embodiment 700 of detecting angle of arrival and angle of departure for a target in accordance with the present disclosure. As shown, antenna arrays 706 and 708 are present on both the target 702 and tracker 704 (each side's antennas shown separately) to create spatial diversity (i.e., different angles). In the case of either AoA or AoD, a platform can sample off of each available antenna independently to mitigate for nulls on any one specific antenna instance. Normal AoA would be done with an antenna array in the wireless BLE enabled device receiving a signal transmitted from a single antenna device. However, if the other device was a similar device with multiple antennas, the transmitting device can send the signal from all of its antennas and the receiving device can sample this signal across all of its antennas. The multiple platform antennas can be used in combination with each other to achieve added physical (spatial) diversity. As an example, FIG. 8 is a diagram illustrating an example embodiment of antenna array switching patterns in accordance with the present disclosure. As shown, a platform with 3 physical antennas which can be connected in several simultaneous combinations to provide up to 7 distinct antenna configurations. However, more or less antennas and combinations can be used without departing from the scope of the technology disclosed herein. The antenna patterns shown include the antenna gain pattern for all the BLE channels in the 2402-2480 MHz frequency band. If a different antenna model is used for each frequency, a better correlation to the incident angle can be found. As shown, 3 physical antennas (antennas 1, 2, and 3), in this example, were combined with an RF switch in a binary fashion to form 7 antennas with unique antenna patterns.

Figure 9:
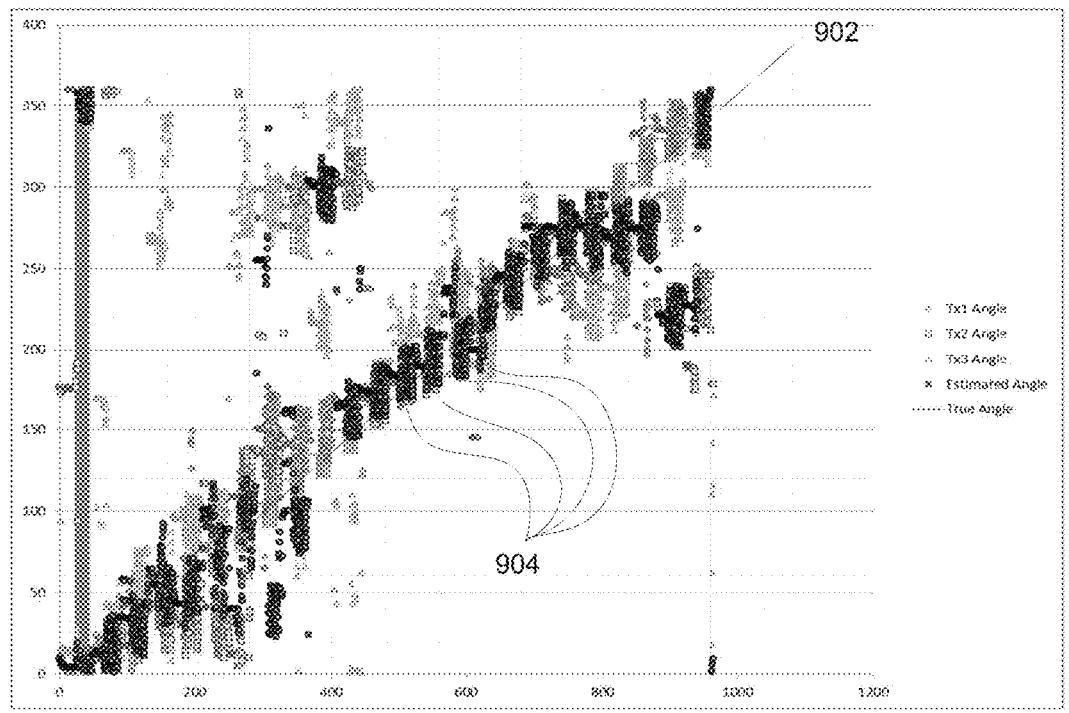
FIG. 9 is a diagram illustrating an example embodiment of multiple angle estimation in accordance with the present disclosure.

FIG. 9 is a diagram illustrating an example embodiment of multiple angle estimation in accordance with the present disclosure. As shown, a plot shows a calculated AoA from the three antennas separately (Tx1, Tx2, and Tx3) and the output of an algorithm that combines the data from all three TX antennas to form the expected angle 902.

In yet another embodiment, other platform sensors are used in combination to filter out "bad" samples. Other sensors include, but are not limited to, compass, gyroscope, sensors which detect an angle of a device (e.g., phone), sensors which detect alignment of antenna patterns with angle of phone, etc. For example, the use of gyro information can be employed to qualify as a measurement that is outside of a specific "range" and thus, bad. FIG. 9 illustrates an example embodiment of using this gyro information. Data is taken on a rotating platform which is sweeping the phone back and forth by +/−15 degrees. The gyroscope is used to track the angle and provide an accurate representation of the angle, seen as vertical lines 904 in the plotted data.

Figure 10:
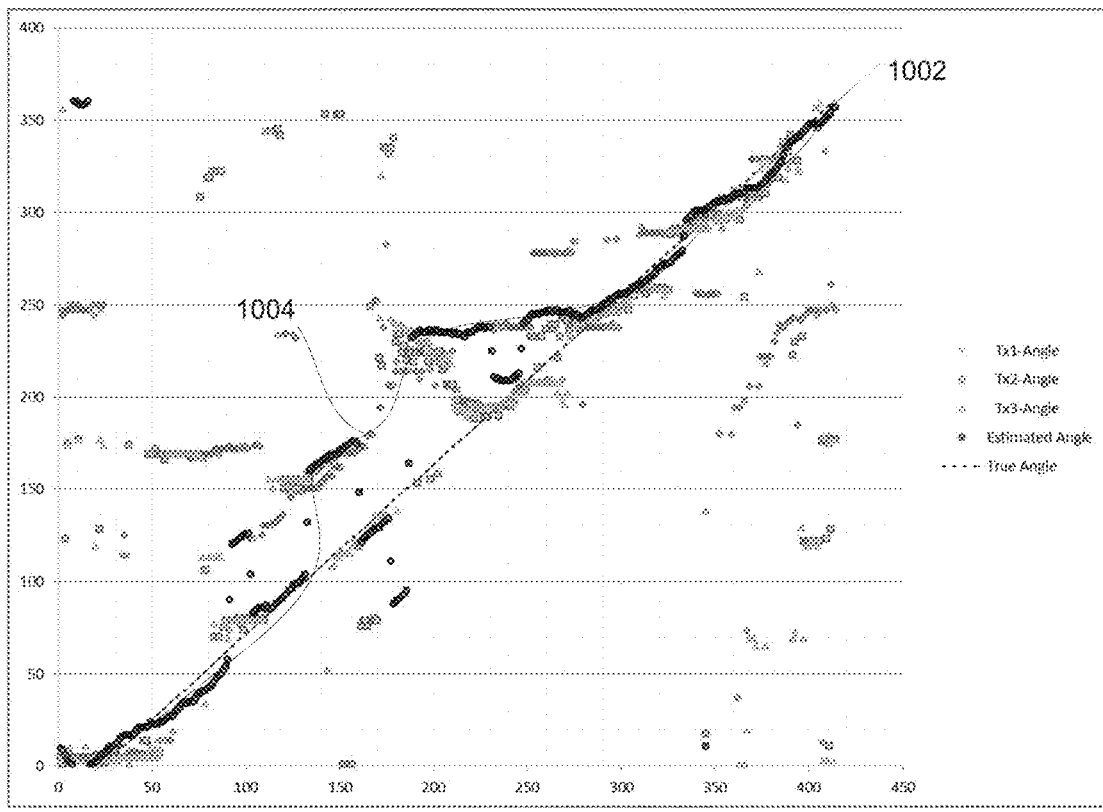
FIG. 10 is a diagram illustrating an example embodiment of multiple angle estimation in accordance with the present disclosure.

FIG. 10 is a diagram illustrating an example embodiment of multiple angle estimation in accordance with the present disclosure. As shown, a plot shows a 3 antenna device calculating AoA of a signal that came from another device transmitting from 3 antennas. The black curve 1004 is the composite from the algorithm. In this data, the phone is not being rotated back and forth +/−15 degrees, but rotated in a continuous fashion 360 degrees as described further in association with FIG. 11. FIG. 10 provides improved results when compared to FIG. 9 as 3 antennas on both the transmitter and receiver are employed to calculate angle of incidence, whereas FIG. 9 uses 3 antennas on the receiver, but only one on the transmitter. The expected angle is shown as line 1002.

Figure 11:
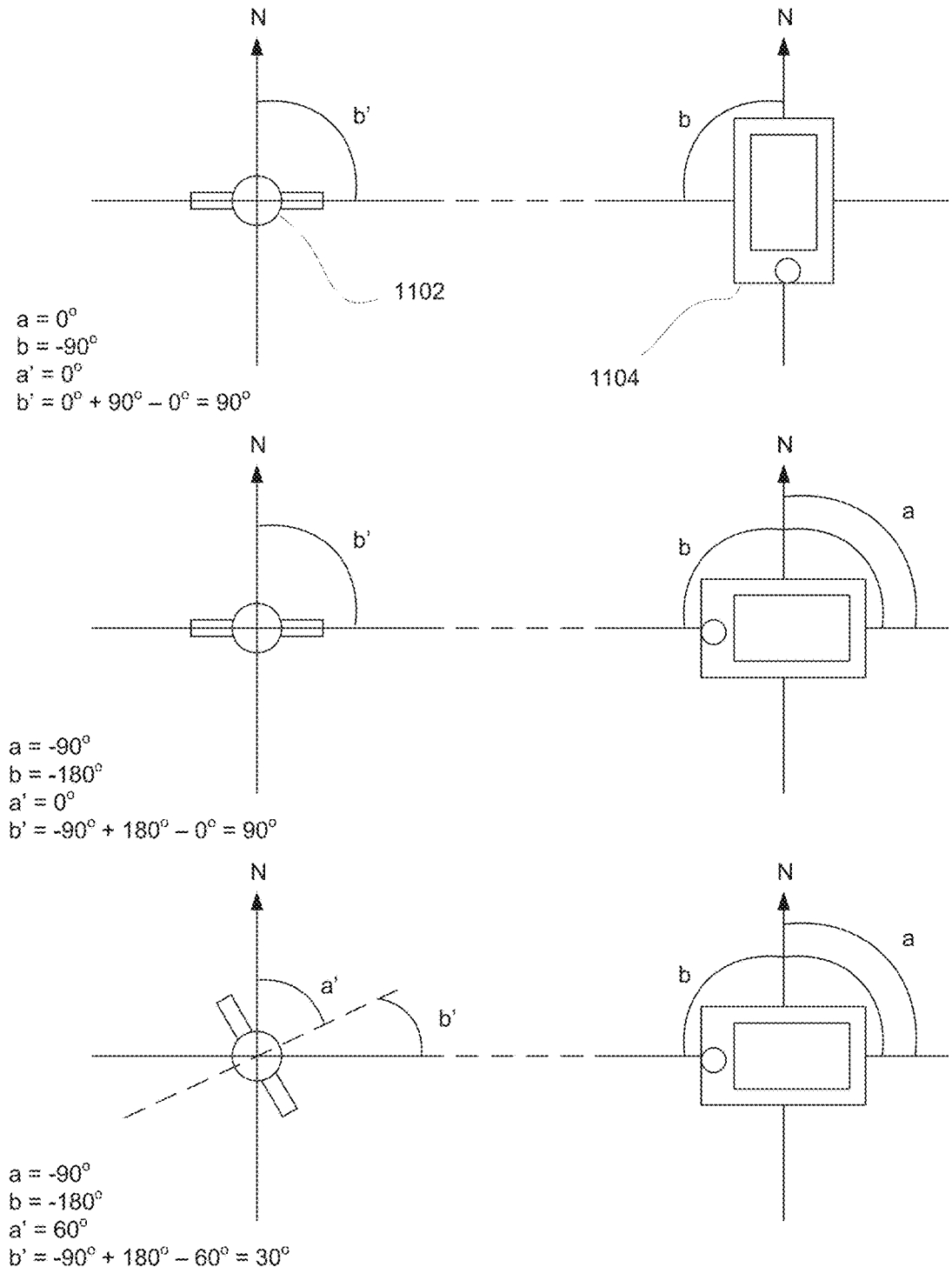
FIG. 11 is a diagram illustrating an example embodiment of multiple angle estimation in accordance with the present disclosure.

FIG. 11 is a diagram illustrating an example embodiment of multiple angle estimation in accordance with the present disclosure. As shown, a watch 1102 and a phone 1104 can interact with either AoA or AoD where one side is always the target but both sides can track each other. In this figure, the watch is always transmitting as the target and the phone is always receiving as a tracker. Here they are running AoA in a connection oriented model. The watch is trying to find the phone even though the watch is the AoA tracker and transmitting the all ones to the phone. The phone sends back its derived angle of incidence (b) back to the watch over the BLE connection. Both sides can derive their orientation to true North via on board compass/gyro. With this information, both platforms can point back to (and find) each other. As shown, a=phone's angle from true North; b=angle of incidence from watch transmitter to phone receiver; a'=watch's angle from true North; and b'=derived angle of watch from angle of incidence=a−b+'a (displayed arrow on watch).

Figure 12:
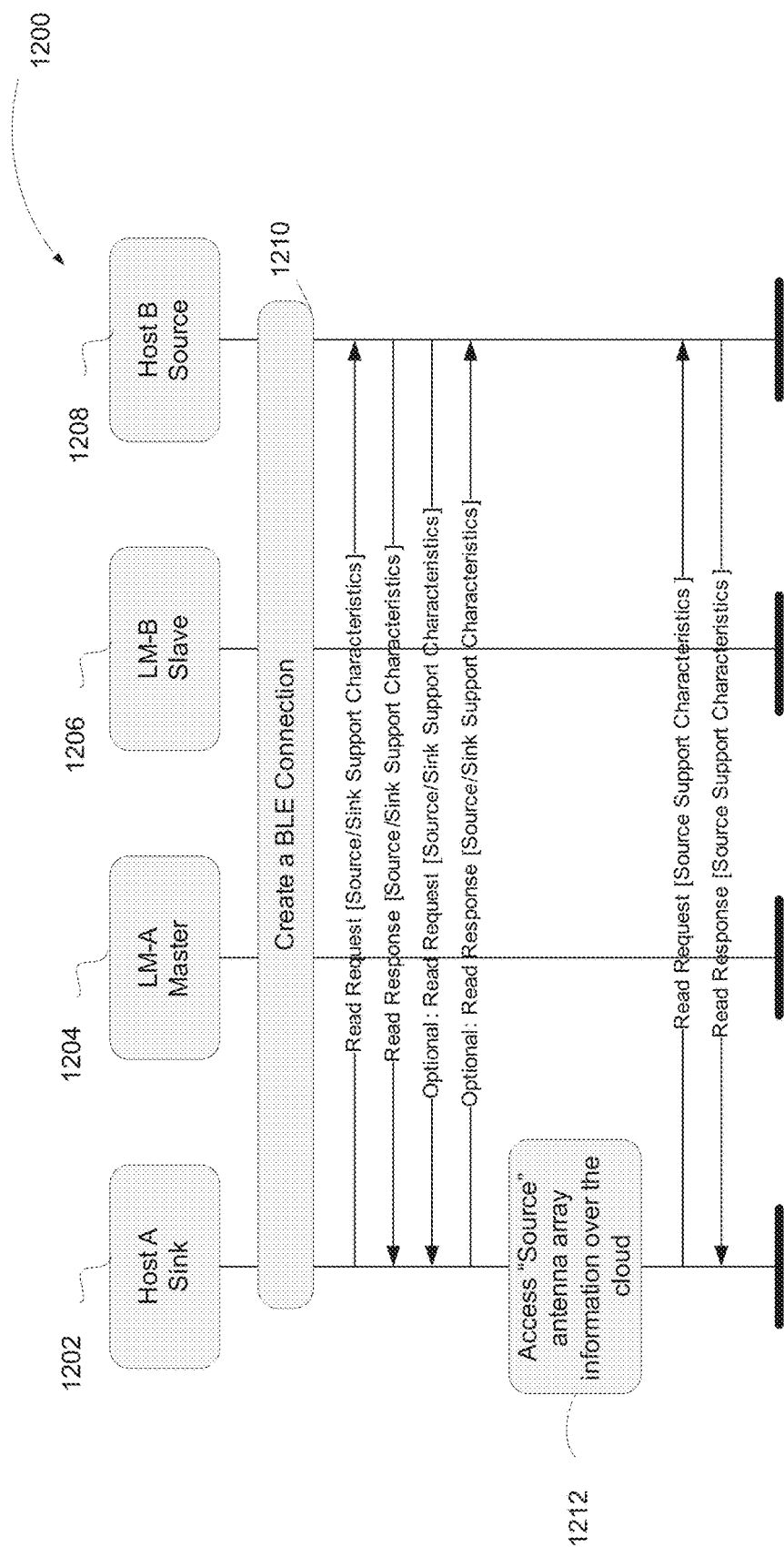
FIG. 12 is a diagram illustrating simplified directionality with antenna models in accordance with the present disclosure.

FIG. 12 is a diagram illustrating simplified directionality with antenna models in accordance with the present disclosure. As shown, antenna models are used to calculate the direction rather than traditional geometric methods. Because antennas may not have stable phase centers, eliminating simple geometric calculation methods may be beneficial. Once a model is taken, it can be used by an algorithm in many platforms using the same array structure. FIG. 12 illustrates message sequence charts 1200 depicting interaction between the two hosts, each host and controller and the two controllers in order to exercise the antenna models function during an example BLE connection 1210. More specifically, FIG. 12 is diagram illustrating preparing source host for simplified directionality transmissions in accordance with the present disclosure (including Host A Sink 1202, LM-A Master 1204, LM-B Slave 1206 and Host B Source 1208). Simplified directionality is an App based function that relies on a platform application to form the cohesive backbone between the transmitter and receiver functions. The application is responsible for (but not limited to) providing cloud based access to directionality databases 1212 that contain an antenna array configuration based on a unique 128-bit QUID (universally unique identifier) value and/or an antenna phase/array table based on a unique 128-bit QUID value. UUIDs are included in the Directionality Service AD type in both connection and connectionless models (see FIG. 3). However, cloud based information is not strictly limited to static broadcast implementations. For example, once an antenna model is derived it can also be stored in a non-volatile memory (NVM) bank on the tracker device (vs. accessing it via the cloud). Each is organized on unique 128-bit UUID values such as location information and/or advertising information. For antenna configuration, an 128-bit UUID value that points to the cloud based database containing the physical antenna configuration including number of antenna used and antenna orientation (e.g., planer, spherical, unidirectional, omni-directional, PIFA, straight edge, etc.). For Antenna Phase/Array UUID, a 128-bit UUID value that points to the cloud based database containing the phase/array table for the respective transmitter or receiver.

Alternatively, in another embodiment, all simplified directionality enabling cloud based information is organized off of a single 128-bit UUID. Single UUID organization may be applicable when employing a broadcast transmitter.

In yet another embodiment, network beacons can be connected to coordinate their behavior. For example, when little or no activity is detected by the beacons, they can enter a low power state. When one beacon detects a device presence, it can communicate to beacons within proximate to the detecting beacon to power up and become active. The connected beacons can also, in one embodiment authenticate beacons using encrypted methods.

The embodiments of the present disclosure may be practiced in a variety of wireless communication devices that operate in a wireless Bluetooth (BT) environment or network. The examples described herein pertain to devices that operate within the Bluetooth low energy (BLE) specification (also BT standard and/or protocol) in the 2.4 GHz ISM band and utilizing one of the IEEE 802.11 protocols (e.g. 802.11a/b/g/n). In one embodiment, beacons are equipped with smaller (in number) antenna arrays in an etched design in order to simplify manufacturing. However, the embodiments of the present disclosure may be readily adapted to other standards, protocols, fields, field lengths, field content, frequency bands, number of antennas, antenna arrays, sensors, devices, etc.

One or more benefits of the present disclosure include, but are not limited to, modeling an antenna array to overcome the requirement for an antenna with a stable phase center.

As may also be used herein, any transmitting/receiving BLE enabled devices include computer and telecommunication processing capabilities carried out by, but not limited to, "processing modules", "processing circuits", "processors", and/or "processing units" that may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" may be used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for operating a communication device, comprising:
    operating a plurality of antennae for receiving a transmitted Bluetooth low energy communications signal, the transmitted Bluetooth low energy communications signal transmitted from at least one additional proximate communication device;
    monitoring for one or more incoming Bluetooth low energy communication signals;
    synchronizing with at least one channel of the one or more incoming Bluetooth low energy communication signals;
    decoding directionality information included within at least one of the one or more incoming Bluetooth low energy communication signals located in the at least one channel;
    processing the decoded directionality information thereby generating at least one estimate of an angle of incidence corresponding to the transmitted Bluetooth low energy communications signal transmitted from at least one additional communication device; and
    processing a plurality of angles of incidence together based on a coalescence of the at least one estimate of an angle of incidence for the plurality of antennae of the communication device and a received second estimate of an angle of incidence measurement of a plurality of antennae located on the at least one additional proximate communication device.

2. The method of claim 1 further comprising: when an incoming Bluetooth low energy communication signal is received, determining if this signal is to be used to determine angle of incidence.

3. The method of claim 1 further comprising: when an incoming Bluetooth low energy communication signal is received, determining if this signal is to be used in a connection model or in a connectionless model.

4. The method of claim 1 further comprising: when an incoming Bluetooth low energy communication signal is to be used in a connection model, synchronizing with at least one channel of the incoming Bluetooth low energy communication signals by securing a data channel.

5. The method of claim 1 further comprising: when an incoming Bluetooth low energy communication signal is to be used in a connectionless model, synchronizing with at least one channel of the incoming Bluetooth low energy communication signals by decoding synchronizing information from at least part of an advertising channel payload.

6. The method of claim 5, wherein the processing the decoded directionality information includes identifying repetition coded bits within directionality information and, based on the repetition coded bits, determining the angle of incidence to the plurality of antennae based on a selected bit within the repetition coded bits.

7. The method of claim 6, wherein the repetition coded bits comprise phase shifted data signals.

8. The method of claim 1, wherein the incoming Bluetooth low energy communications signal is compliant with any of: Bluetooth basic range/enhanced data rate (BR/EDR) or Institute of Electrical and Electronics Engineers (IEEE) 802.11.

9. The method of claim 1, wherein Directionality information is broadcast on any of: selected Bluetooth Low Energy (BLE) advertising channels;
    selected Bluetooth Low Energy (BLE) data channels; or
    BLE data channels following a hopping pattern at a specified interval duty cycle.

10. The method of claim 1, further comprises selecting a hopping pattern to transmit directionality information and including anchor information on either of: three selected Bluetooth Low Energy (BLE) advertising channels or three selected Bluetooth Low Energy (BLE) data channels at a different, asynchronous duty cycle.

11. The method of claim 1, wherein the processing the decoded directionality information thereby generating at least one of an estimate of an angle of incidence includes obtaining predetermined antenna models corresponding to a structure of the plurality of antennae.

12. The method of claim 1, wherein the at least one of an estimate of an angle of incidence includes a plurality of angles of incidence processed from a unique configuration of the plurality of antennae to determine the at least one estimate.

13. The method of claim 1, wherein the plurality of angles of incidence are processed together based on a coalescence of a set of first multiple angle measurements for the plurality of antennae of the communication device and a received set of second multiple angle measurements of a plurality of antennae located on the at least one additional communication device.

14. The method of claim 1, wherein the decoding directionality information included within at least one of the incoming Bluetooth low energy communication signals located in the at least one channel further comprises ancillary position information.

15. The method of claim 14, wherein the ancillary position information comprises any of: sensor data from any of: platform sensors, compass, gyroscope, sensors which detect an angle of a device, sensors which detect alignment of antenna patterns with angle of the communication device; coordinates; or beacon information.

16. The method of claim 15, wherein the beacon information includes any of: beacon identification or beacon diagnostic information.

17. An apparatus, comprising:
    a wireless communications device including one or more antennas for receiving and synchronizing with a Bluetooth low energy wireless signal, including a directionality field, transmitted from at least one additional apparatus;
    antenna angle of incidence circuitry receiving the directionality field and determining at least one angle of incidence;
    processing circuitry, coupled to the antenna angle of incidence circuitry, configured for processing the at least one angle of incidence with at least one ancillary position data input to determine a relative position of the wireless communications device with the at least one additional apparatus and further configured for processing a plurality of angles of incidence together based on a coalescence of the at least one angle of incidence for a plurality of antennae of the wireless communications device and a received second angle of incidence measurement of a plurality of antennae located on the at least one additional apparatus.

18. The apparatus of claim 17, wherein the wireless communications device is further configured to identify repetition coded bits within the directionality field.

19. The apparatus of claim 17, wherein the at least one ancillary position data input includes a determined location corresponding to the at least one additional apparatus.

20. The apparatus of claim 17, wherein:
the Bluetooth low energy wireless signal is compliant with any of: Bluetooth basic range/enhanced data rate (BR/EDR) or Institute of Electrical and Electronics Engineers (IEEE) 802.11.

\* \* \* \* \*